March 2, 1971 — E. H. IRASEK — 3,566,524
SEARCH AND RETRIEVAL DEVICE FOR CARD-TYPE ITEMS
Filed June 5, 1969 — 10 Sheets-Sheet 1
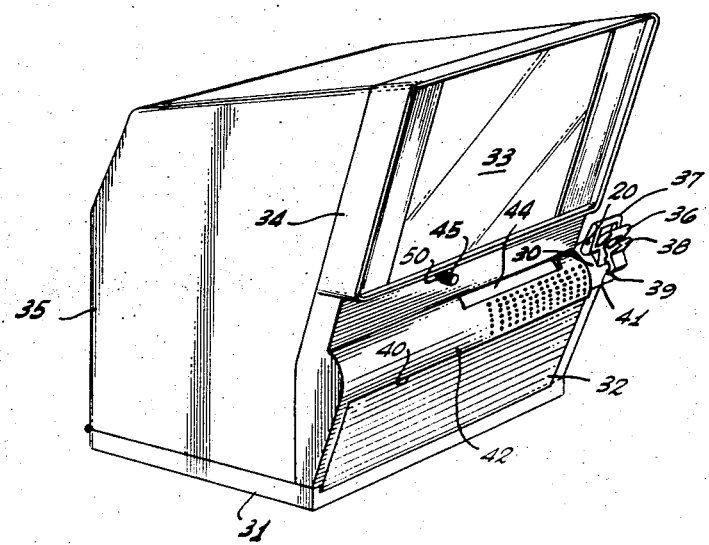
Fig.1
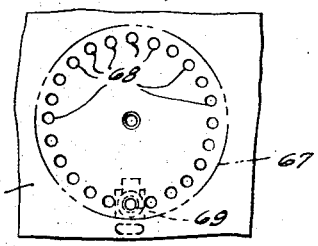
Fig.3
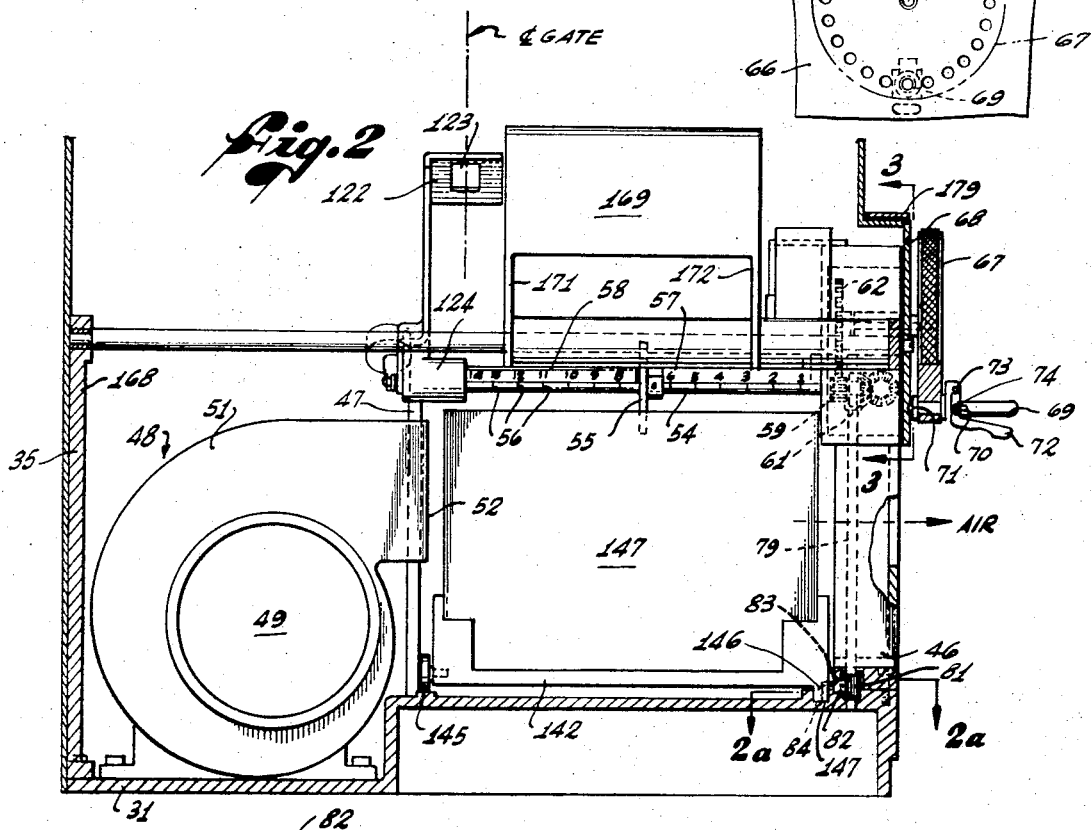
Fig.2
Fig.2a
INVENTOR.
EUGENE H. IRASEK
BY Zulurider, Patton, Rieber Lee, & Utecht
ATTORNEYS March 2, 1971 E. H. IRASEK 3,566,524

SEARCH AND RETRIEVAL DEVICE FOR CARD-TYPE ITEMS

Filed June 5, 1969 10 Sheets-Sheet 3

INVENTOR.
EUGENE H. IRASEK
BY Fulwider, Patton, Rieber, Lee, and Utecht
ATTORNEYS

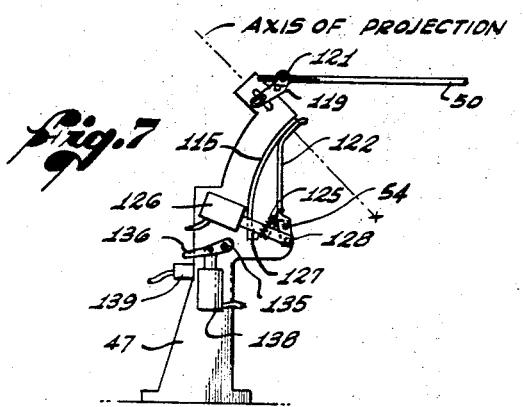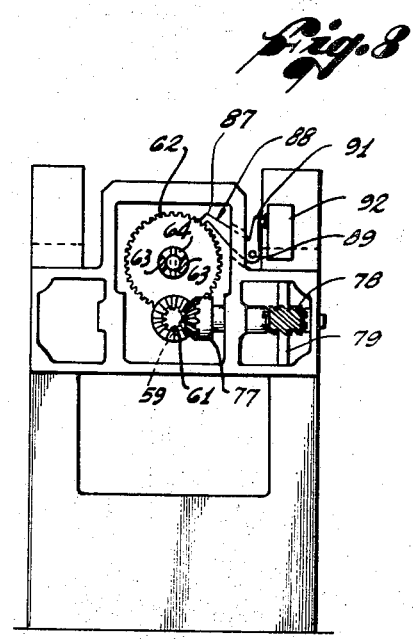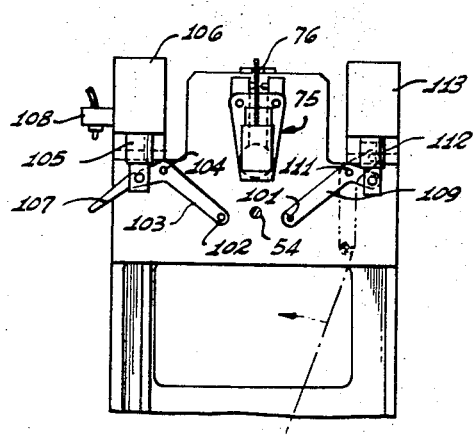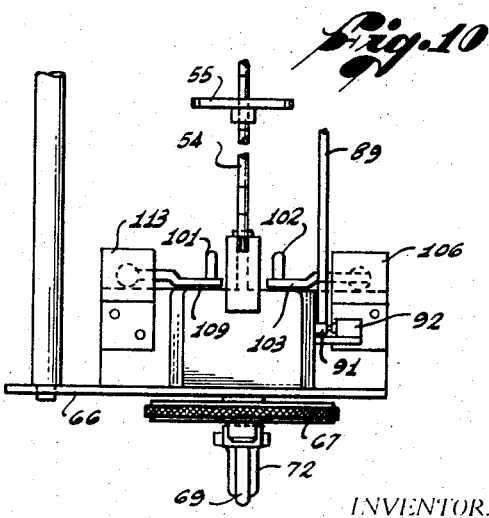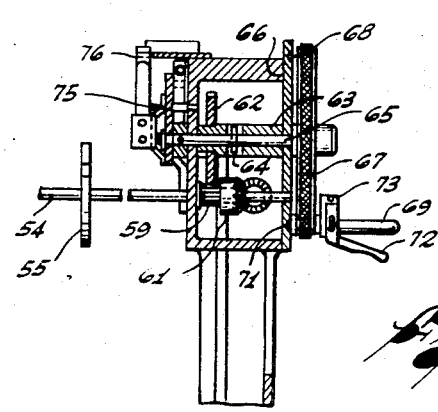

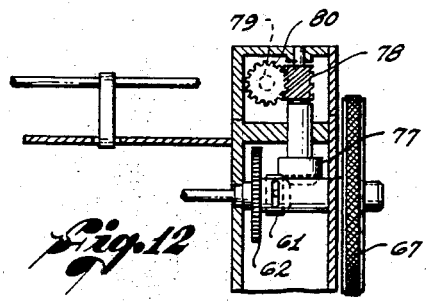
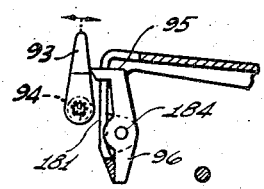
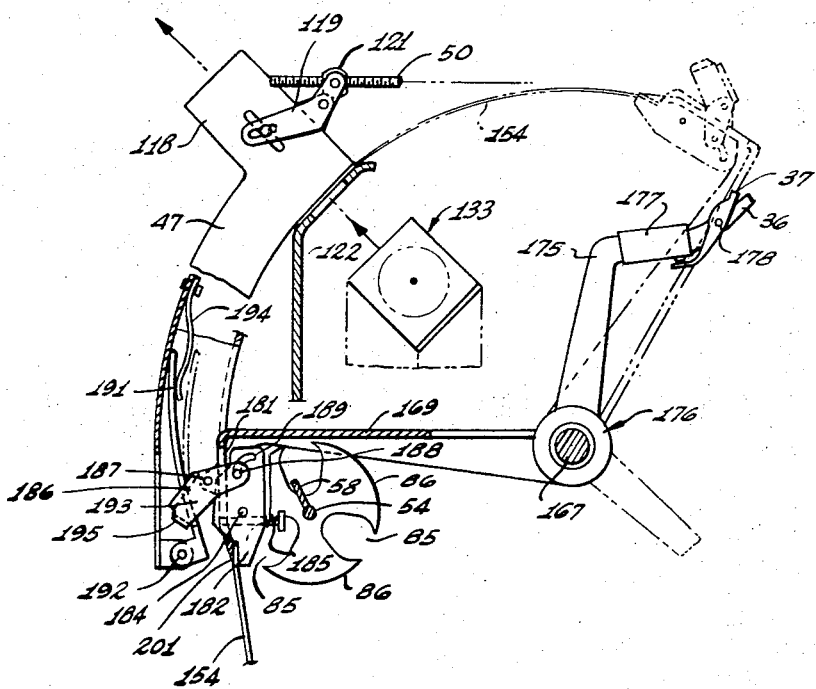
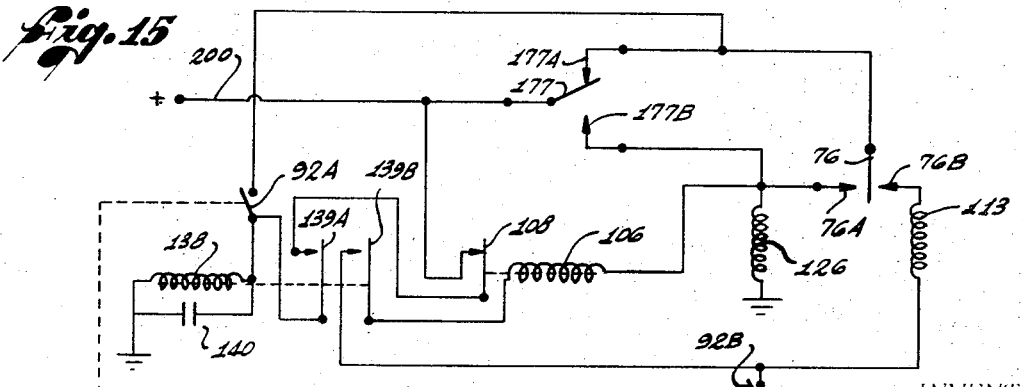

March 2, 1971  E. H. IRASEK  3,566,524
SEARCH AND RETRIEVAL DEVICE FOR CARD-TYPE ITEMS
Filed June 5, 1969  10 Sheets-Sheet 6
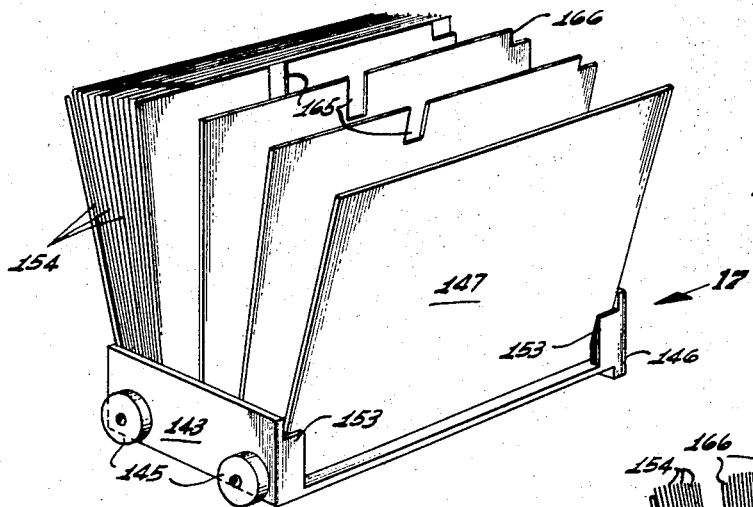
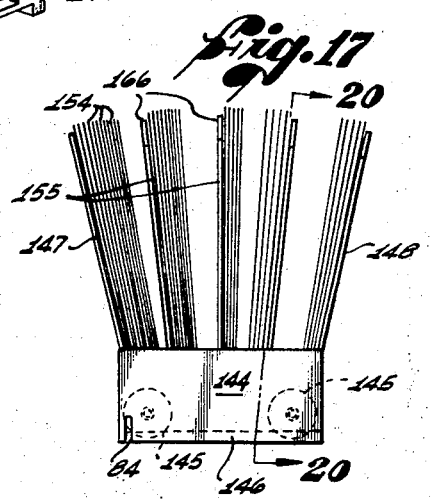
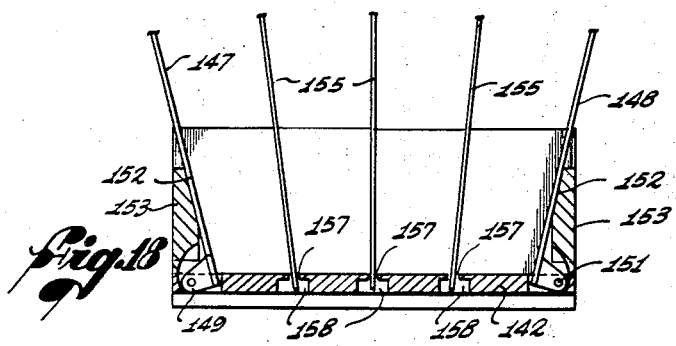
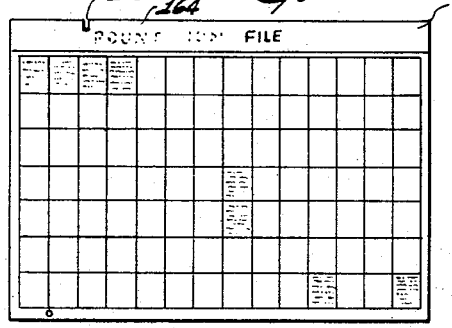
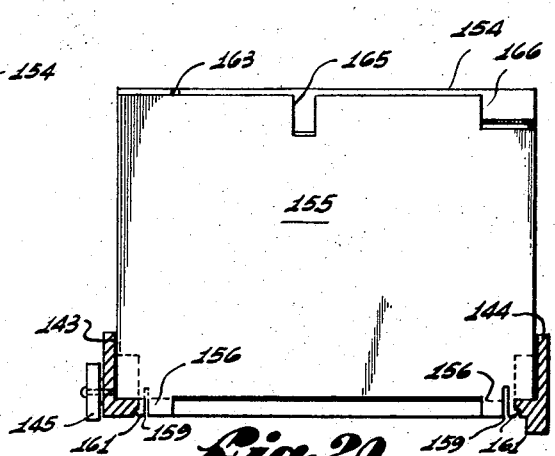
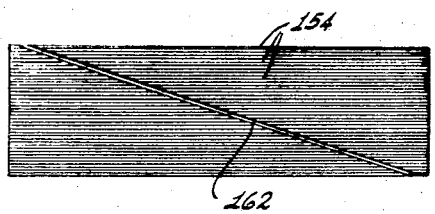
INVENTOR.
EUGENE H. IRASEK
BY Fulwider, Patton, Rieber, Lee, and Utecht
ATTORNEYS INVENTOR.
EUGENE H. IRASEK
BY Zulwider, Patton, Ruber
Lee, and Utecht
ATTORNEYS

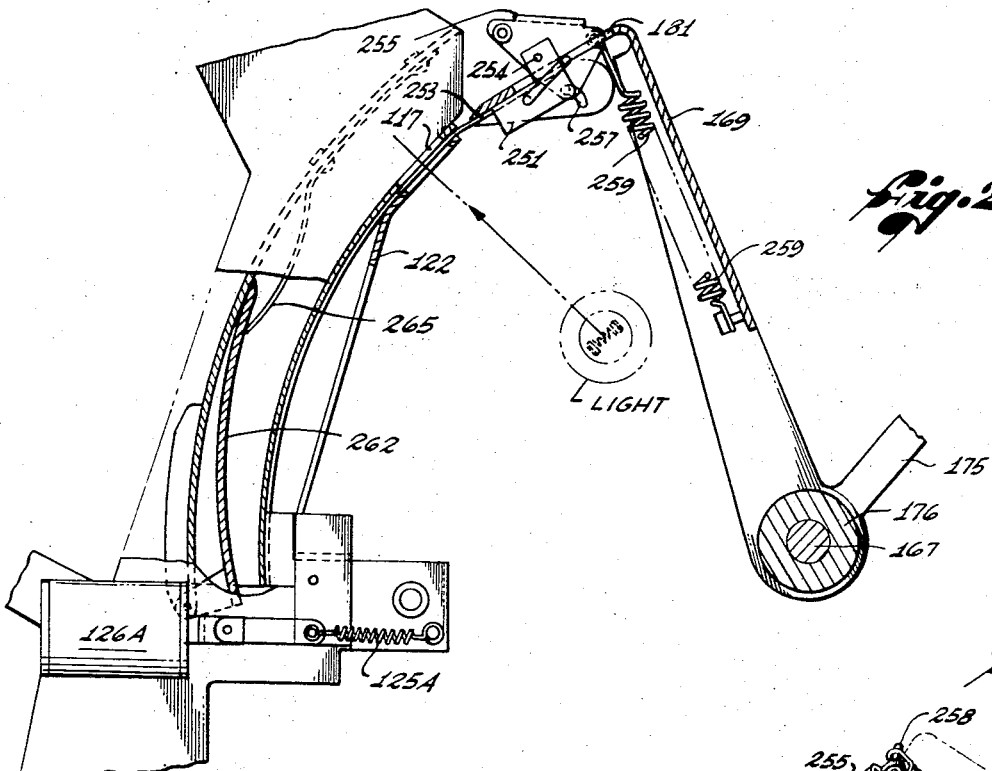
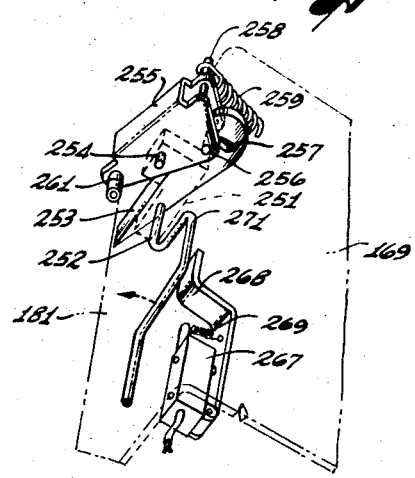
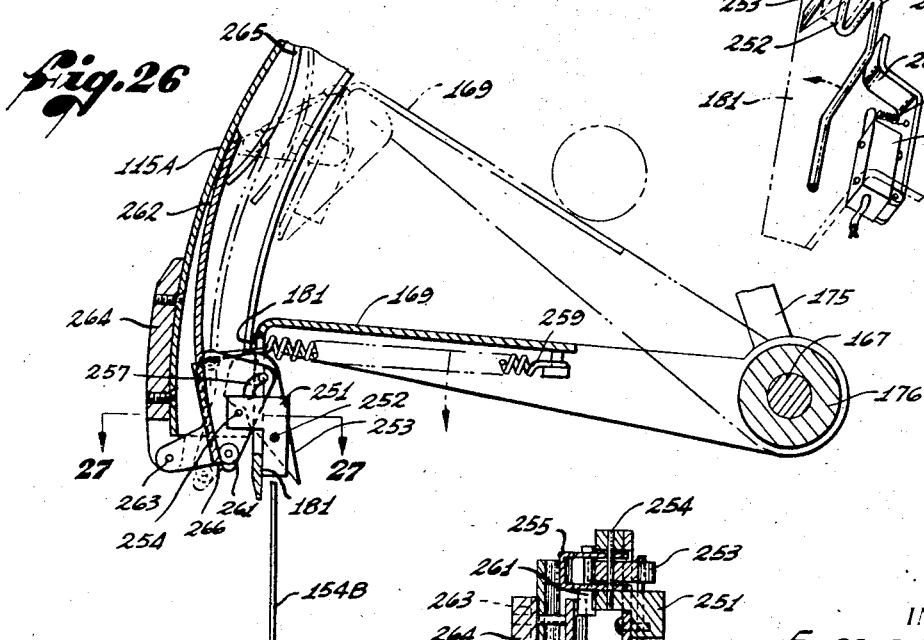

March 2, 1971  E. H. IRASEK  3,566,524
SEARCH AND RETRIEVAL DEVICE FOR CARD-TYPE ITEMS
Filed June 5, 1969  10 Sheets-Sheet 9
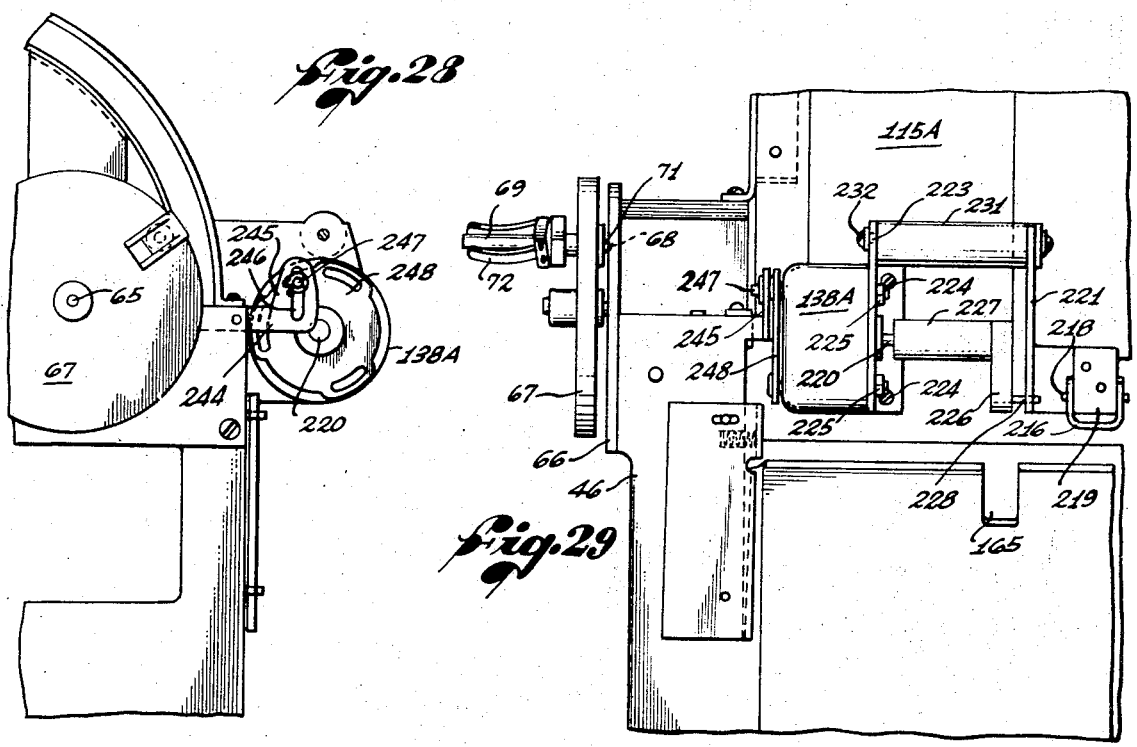
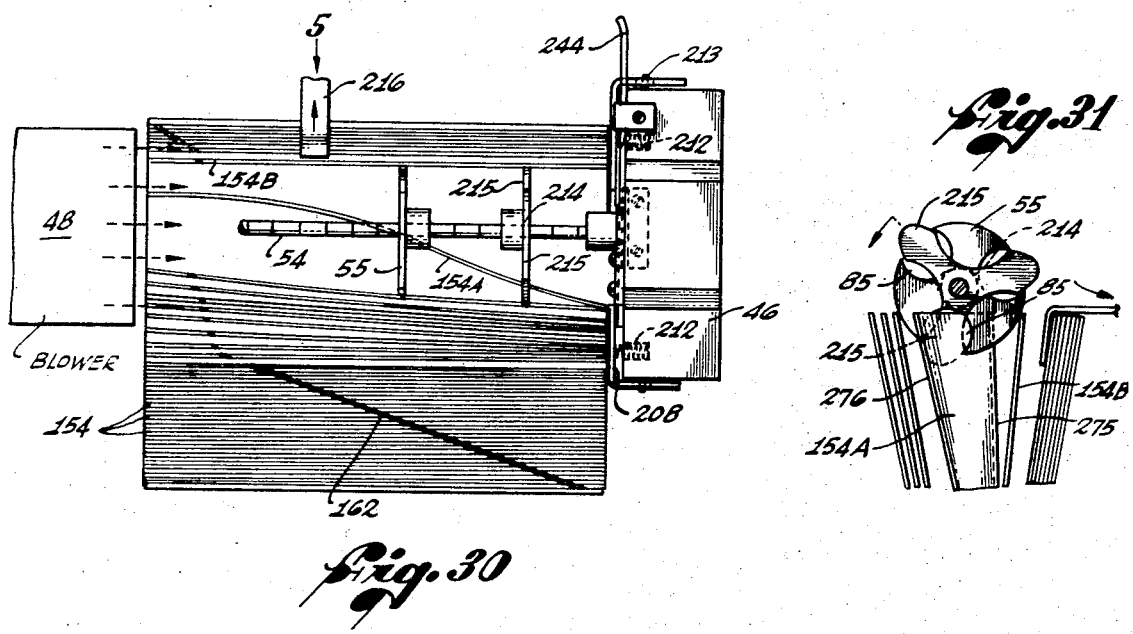
INVENTOR.
EUGENE H. IRASEK
BY Fulwider, Patton, Rieber
Lee, and Utecht
ATTORNEYS March 2, 1971          E. H. IRASEK          3,566,524
SEARCH AND RETRIEVAL DEVICE FOR CARD-TYPE ITEMS
Filed June 5, 1969          10 Sheets-Sheet 10
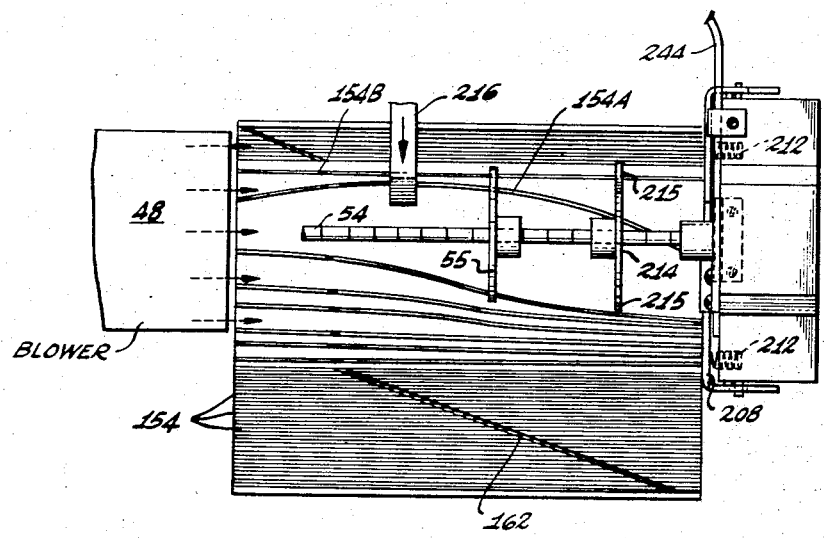
Fig. 30A
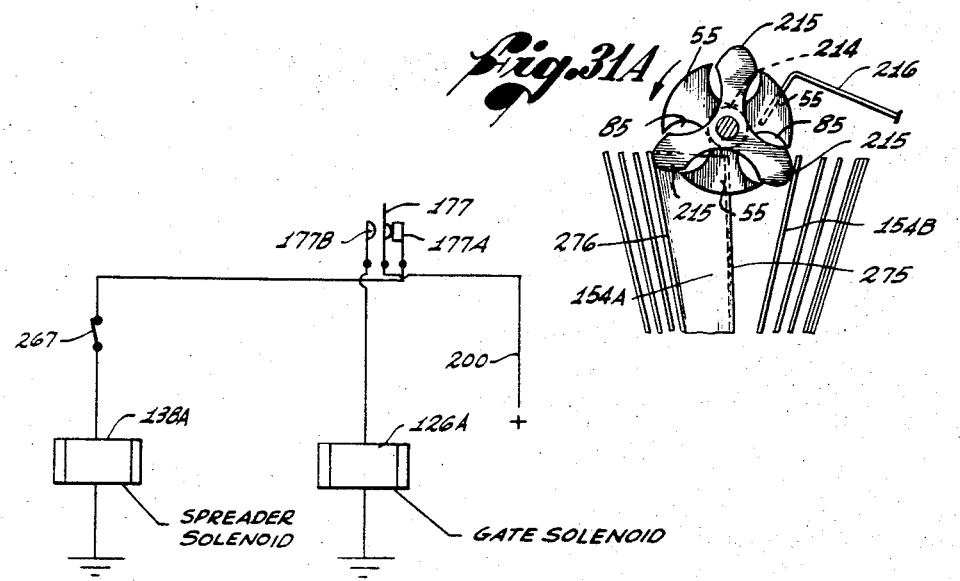
Fig. 31A
Fig. 32
INVENTOR.
EUGENE H. IRASEK
BY Fulwider, Patton, Rieber,
Lee, and Utecht
ATTORNEYS United States Patent Office 3,566,524
Patented Mar. 2, 1971

3,566,524
SEARCH AND RETRIEVAL DEVICE FOR
CARD-TYPE ITEMS
Eugene H. Irasek, Palos Verdes Peninsula, Calif., assignor
to HF Image Systems, Inc., Culver City, Calif.
Filed June 5, 1969, Ser. No. 830,771
Int. Cl. G09f 11/30
U.S. Cl. 40—78.05
33 Claims

ABSTRACT OF THE DISCLOSURE

A search, retrieval and display device for card-type items such as microfiche located in a horizontal stack magazine. The magazine with the items therein is moved through the device with an air blast directed side to side through the items to separate them individually. A riffling member rotates at right angles to the items and has spaced peripheral gate notches therein receiving the upper edges of the cards to separate them individually by a substantial space therebetween. The desired card in the magazine may be identified optically by indicia or other identification, and carrier means is provided for entering the magazine stack, picking up a desired microfiche or other card, and moving it in X and Y directions into an optical path which displays the desired image on the item onto a screen. After viewing, the item is returned to the same place within the magazine and is automatically disengaged from the carrier, and the device is set up for again riffling the magazine stack to identify another item desired for retrieval and display. Riffling and magazine movement are effected in both directions depending upon the direction of rotation of the operating mechanism.

BACKGROUND OF THE INVENTION (1) The present invention is directed to search, retrieval and display devices for card-type items, such as microfiche and the like, which are individually identifiable and are stacked or stored in side-by-side horizontal relation in relatively small magazines in which they may be rapidly scanned for the location, pick-up and display of the desired item or portion thereof, with a selected item returned to its magazine position after display.

(2) While the device may be used on any card-type items within the meaning of the term as defined hereinafter, it finds particular adaptation to the field of microfiche storage wherein cards or sheets of photographic film of the order, by way of example only, of 3½ in. x 5¾ in., may have as many as ninety eight individual images thereon in, for example, fourteen columns of seven rows each. With such microfiche, a magazine of only two inches thickness may hold over two hundred microfiche cards containing approximately twenty thousand individual images. Thus, a magazine approximately 2 in. x 3½ in. x 5¾ in. could contain the microfiche equivalent of sixty or more good-sized books.

The convenience and saving in space of such storage is obvious and the subject of more and more utilization for information storage, but presents a problem in the research and retrieval of the stored information which has been the subject of many approaches from the standpoint of speed, economy, availability and overall size and complexity for searching and magazine items and displaying the information desired by means of a visual screen, print-out or other read-out means. Many large complex devices have been proposed heretofore, but they have the disadvantages of large size, complexity, expense, unreliability and inconvenience which have been overcome in substantial degree by the improved search, retrieval and display devices of the present invention.

SUMMARY OF THE INVENTION

The terms "cards" and "card-type items" referred to hereinafter upon which the device of the present invention is designed to operate are intended to cover a variety of items, including cards and sheets of the nature of ledger cards, magnetic cards, optical cards, punch cards and the like, and more particularly, film cards, microfiche and microfilm jackets, the specific example given being a microfiche card or sheet carrying a large number of individual images in columnar and row form thereon.

The devices of the present invention will operate on any size cards and any length magazines, the previous example of a small, 2 inch thick magazine being given by way of example for easy desk or drawer storage, although it is apparent that the device is equally operable on magazines of almost unlimited length.

The primary object of this invention is the provision of an improved, simplified, reliable and economical search, retrieval and display device for card-type items which will rapidly riffle the horizontally stacked cards in a magazine to locate a desired card at a position where it may be picked up by a manipulator and moved to a delivery position, which again may be any type of delivery gate, but is specifically illustrated in the preferred embodiments as an optical gate wherein the desired image on a microfiche is located for projection and display on an optical screen.

The cards in the magazine are separated one from the other by means of an air blast passing sidewise thereacross and are individually riffled from one side to the other of what may be termed a card gate member rotating in a plane at right angles to the cards and having peripheral gate notches therein within which the upper edges of the cards are received to move them individually past the card gate riffling member. The card gate member may be manually or motor driven and is interconnected with the magazine drive so that the magazine is bodily moved past the card gate member at the same time the cards are being individually riffled past the member.

The upper corners of the cards opposite the edges at which the air blast enters are desirably held back or hindered in their movement so that the separation of the cards into indvdiual items is facilitated both at the airintake end and adjacent the center of the cards where the card gate member is located to riffle individual cards therepast. The hold-back devices may be solenoid or spring-biased into frictional engagement with the upper corners of the cards on whichever is the downstream side of the card gate member in the operating cycle, or, alternatively, a rotary card-engaging element may be mounted to rotate coaxially with the card gate member.

A separator for the cards is provided which operates to hold the cards separated from the card to be removed at the upstream side of the card gate member, and means are provided for operating the separator in sequence with the operation of the device so that the separator exerts its force on the cards only during manipulation of a card and is withdrawn from the magazine file during the riffling, search operation.

A card manipulator is provided with clamping fingers engaging the upper edge of the selected card, which fingers are automatically operated to closed positions as the manipulator is moved into card engagement to effect the clamping operation and are automatically opened on card return to release the clamping fingers from the card.

The cards in the magazine may be provided with a transversely inclined top notch providing spaced notches in the individual cards by which they may be compared to a scale for rough location of a particular card in the magazine at the card gate member. Final identification can be effected by card indicia or description with the cards riffled in either direction to locate the desired card at the pick-up and removal position. The card manipulator may then be rotated to remove a card from the magazine and to locate a desired image in the Y-direction, after which the manipulator may be linearly traversed across the device to locate the desired image in the X-direction, so that the image to be viewed is located in an optical gate.

An indexer may have means thereon individual to the images on the card which are engaged by means on the manipulator to positively locate a desired image in position in the optical gate. As specifically illustrated, the indexer comprises holes located similarly to the images on the microfiche card and the manipulator includes a detent insertable into the hole corresponding to the image desired to be viewed. The optical system may be of standard configuration and may be modular in form so that it can be removed for the substitution of a reproducer or other print-out device.

The device may be provided with an elongated view port through which the card notches and indicia may be viewed to locate the desired card at the pick-up and removal point.

Electrical and mechanical interlock means are provided in the device to insure the proper sequence of operation in searching a magazine and removing and displaying a desired card image.

Other objects and features of the invention will be apparent to those skilled in the art from the following specification and the appended drawings.

BRIEF DESCRIPTION OF THE DRAWINGS

FIG. 1 is a perspective view of the search, retrieval and display device of the present invention;

FIG. 2 is a vertical sectional view of the device taken in back of the front wall and with parts broken away;

FIG. 2a is a detail sectional view on the line 2a—2a of FIG. 2;

FIG. 3 is a detail sectional view on the line 3—3 of FIG. 2;

FIG. 7 is a side elevational view of a supporting standard including the optical gate;

FIG. 8 is a view partly in vertical section and partly in elevation of the right hand side of FIG. 2;

FIG. 9 is an elevational view from the opposite side of the standard from FIG. 8 and showing the card hold-back mechanisms;

FIG. 10 is a partial plan view of the hold-back mechanism of FIG. 9;

FIG. 11 is a vertical sectional view through the right hand standard of FIG. 2 showing the operating mechanism;

FIG. 12 is a detail horizontal sectional view through the operating mechanism of FIG. 11;

FIG. 13 is a detail view of a clamping finger for card pick-up and a detent operating lever arm engaged thereby;

FIG. 14 is a partial view similar to FIG. 4 showing the card carrier in its loaded pick-up position in full lines and a card image in the optical gate in dotted lines;

FIG. 15 is a schematic wiring diagram for the device;

FIG. 16 is a perspective view of one form of magazine for the card-type items;

FIG. 17 is an end elevational view of the magazine of FIG. 16;

FIG. 18 is a longitudinal sectional view on an enlarged scale through the magazine of FIGS. 16 and 17;

FIG. 19 is a top plan view of a card deck with a diagonal identifying notch across the top thereof;

FIG. 20 is a transverse sectional view through the magazine on the line 20—20 of FIG. 17;

FIG. 21 is a view of a typical microfiche card from the magazine stack;

FIG. 24 is an enlarged view showing the card manipulator in an image-displaying position;

FIG. 25 is a detail view of the card clamping finger mechanism of the second embodiment;

FIG. 26 is a view showing in full lines the manipulator entering the magazine and just prior to card pick-up and in dotted lines after card pick-up and moving toward display position;

FIG. 27 is a detail sectional view on the line 27—27 of FIG. 26;

FIG. 28 is a partial side elevational view of the second embodiment;

FIG. 29 is a partial plan view of the mechanism of FIG. 28;

FIG. 30 is a partially schematic view with separator in and a card in pick-up position;

FIG. 30A is a view similar to FIG. 30 just prior to a card entering a card gate in the riffling wheel;

FIGS. 31 and 31A are schematic representations of the riffling and hold-back operation of the second embodiment; and FIG. 32 is a wiring diagram for the second embodiment.

DESCRIPTION OF THE FIRST EMBODIMENT

Figure 4:
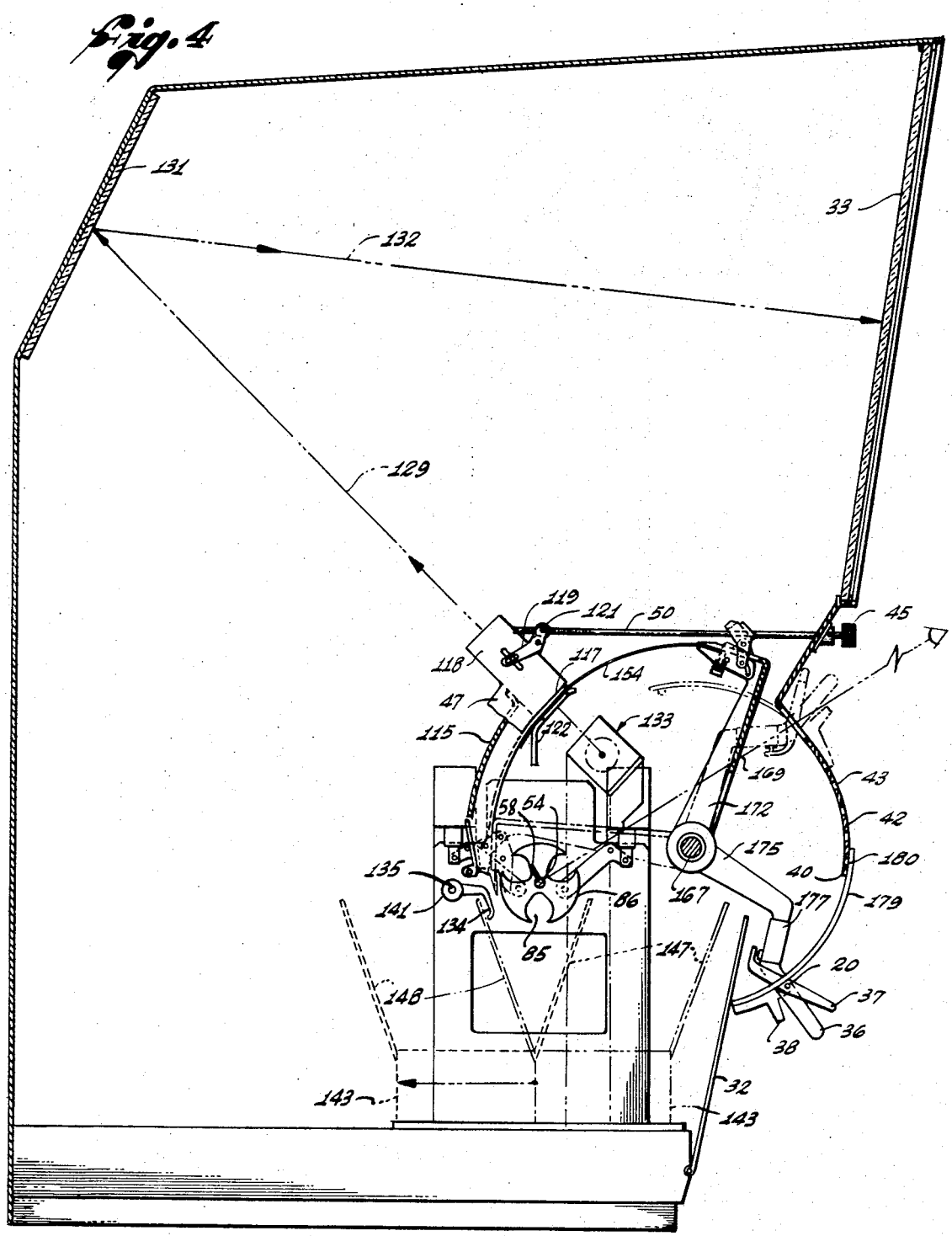
FIG. 4 is a longitudinal sectional view through the device.

Reference is first made to the embodiment illustrated in FIGS. 1–15 of the drawing with reference to the magazine store or stack of FIGS. 16 through 21. This embodiment is illustrated in perspective in FIG. 1 as including a base portion 31, a lower hinged front plate 32, a solid intermediate front plate 42 and an upper front viewing screen 33, mounted in an upper front support 34. A top, side and back enclosure is shown as a unitary piece 35 for ease of illustration, but which should be considered as of any desired sectional construction, particularly where the optical portion of the device is to be a module for removal and substitution of a printer or other reproduction device therefor. An X-Y operating handle is shown at 36 having associated therewith a switch operator 37 and a mechanical detent operator 38, both pivoted on and moving with the X-Y handle 36 at 20. The detent operator 38 carries a detent finger 39 received in a stationary notch 41 in a stationary arcuate plate 30 to hold the X-Y handle 36 and the card manipulator rigid therewith in position above the cards in the magazine to permit the riffling mechanism to operate.

The intermediate front plate 42 terminates at a lower horizontal edge 40 and is provided with rows and columns of indexing holes 43 equal in number to the number of images on the microfiche cards in the magazine which is to be searched. The plate 42 is also provided with an elongated viewing window 44 through which the card notches and the indicia and other identifying matter on the cards may be viewed at the displayed upper edges of the cards. An optical focussing knob 45 is disposed in front of the plate 42 and has its operating shaft 50 extending to the optical lens system for focussing the image on the screen 33.

The operating elements of the device are mounted on a side standard 46 and an interior standard 47, both rigidly mounted on the base 31. Also mounted on the base 31 is a centrifugal fan 48 having an air inlet opening 49, a scroll 51 and an outlet 52 directed transversely across the device so as to establish an air blast between the side edges of the microfiche cards, as shown more particularly in FIG. 6. The fan is driven in conventional manner by an electric motor 53.

A rotatable shaft 54 is journalled in and extends across the standards 46 and 47. A riffling wheel or card gate member 55 is rigidly mounted on the shaft 54 adjacent the mid-portion thereof. The shaft 54 may be provided with line indicia at 56 and stationary numbered strips 57 and 58 are supported in the opposite standards 46 and 47, respectively, to identify the lines 56 on the shaft 54 as viewed through the window 44 in the front plate 42. The left hand end of the shaft 54 as viewed in FIG. 2, turns in a simple bearing in the standard 47 while the right hand end has mounted thereon a pinion gear 59 and a bevel gear 61. The gear 59 meshes with a 1:5 ratio gear wheel 62 (FIGS. 2, 8 and 11) which is mounted on a short shaft 63 having a lost motion connection at a pin and arcuate slot 64 with a central concentric shaft 65.

The shaft 65 extends to the right, as viewed in the figures, through an index plate 66 and has a drive wheel 67 rigidly mounted on its end. The plate 66 has a plurality of circularly disposed pockets 68 therein (see also FIG. 3) and the drive wheel 67 has an operating handle 69 mounted adjacent its periphery, in which handle is reciprocally mounted a detent pin 71 biased to index in the pockets 68. The detent 71 is retracted out of the pockets 68 by an operator 72 hingedly mounted on the handle 69 at 73 and having a slot receiving a pin 74 extending transversely through the detent 71 and reciprocating in a slot 70 in the handle 69. When the operator 72 is moved toward the handle 69 about the pivot 73, it retracts the detent 71 out of an indexed pocket 68 and permits the operating wheel 67 and shaft 65 to turn freely. When the pin 71 is indexed with a pocket 68, the riffling wheel or card gate 55 will be disposed to locate a microfiche card in position for pick up and withdrawal from the magazine, as will be hereinafter described.

The left hand end of shaft 65, as viewed in FIG. 11, is connected to a friction clutch arrangement indicated generally at 75 and which may take any conventional form to operate the central contact of a double-throw switch 76 in opposite directions corresponding to the directions of rotation of the shaft 65 and the directions of riffling through the microfiche cards in the magazine. As will be explained hereinafter, a single-throw switch may be utilized for a single hold-back device which is spring returned.

The bevel gear 61 on the end of shaft 54 meshes with a second bevel gear 77 which drives a worm gear 78 meshing with a worm wheel 80 on a vertical shaft 79. The shaft 79 is mounted in bearings in the standard 46 for rotation therein and has mounted adjacent its bottom end a pinion gear 81 meshing with a reciprocable rack 82 mounted for rectilinear movement fore and aft of the standard 46. The rack 82 carries a pin 83 which engages with a slot 84 in the card magazine (FIGS. 2 and 17) so that rotation of the drive mechanism for the riffling wheel or card gate member 55 also effects slow rectilinear movement of the magazine inwardly and outwardly of the device, depending upon the direction of the riffling operation.

As shown more particularly in FIGS. 4 and 14, the riffling wheel 55 is provided with three equally spaced, peripheral, card gate notches 85 having curved edges and receiving the upper edges of the cards individually to insure separation of the cards and movement of one card at a time past the riffling wheel as the cards in the magazine are searched for the one desired for display. The upper edge of the adjacent card rides on the periphery of the wheel 55 until it is presented with a notch gate 85 into which it is received to be moved as an individual card past the shaft 54 as the riffling wheel rotates. As the card moves in the gate 85 past the shaft 54, its upper edge will be guided against the curved edges of the gate notch, and at the same time, the upper corner of the card opposite the fan 48 will be held back, as will be described hereafter. When a desired card is disposed in proper position for pick-up at the back side of the riffling wheel 55 the detent pin 71 will be indexed in one of the pockets 68 and it is at this time that the identified desired card is picked up and drawn from the magazine for display purposes.

In addition to the engagement of the detent 71 in a pocket 68, the operating wheel 67 is prevented from rotation by a detent 87 mounted at the end of one arm of a bell crank lever 88 rigidly mounted on a shaft 89. The opposite arm 91 of the bell crank lever 88 is positioned to operate a switch 92 mounted on the standard 46. The shaft 89 is journalled in the standard 46 and carries a lever arm 93 biased toward detent engagement position by a spring 94 and moved to detent disengaging position by means of a projection 95 on a card clamping finger 96. The construction is such that with the clamping finger 96 opened and the card manipulator in its normal latched position, the lever 93 and bell crank lever 88 will be rotated by spring 94 to release the detent 87 and operate the switch 92. The contacts of switch 92 are shown at 92A and 92B in FIG. 15 as normally open when the detent 87 is engaged with the gear wheel 62, so that when the switch 92 is operated by the bell crank arm 91 as the detent is disengaged, the contacts 92A and 92B will be moved to closed position.

Figure 6:
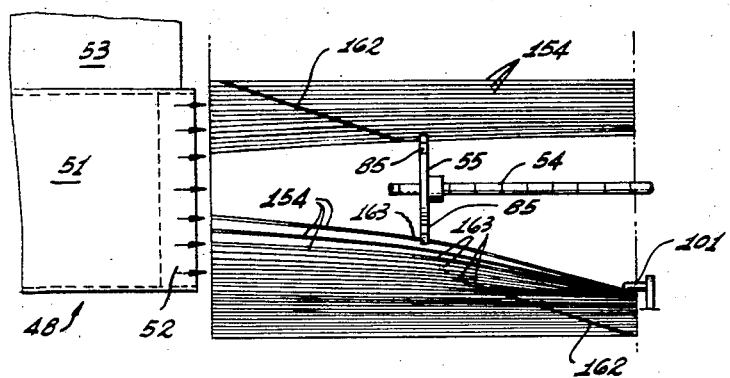
FIG. 6 is a partly schematic view illustrating the card riffling operation.

Hold-back means are provided for the upper corners of the microfiche cards on the side opposite the blower 48, the operation being shown in FIG. 6 where a forward hold-back pin 101 is shown holding back the right hand upper corners of the microfiche cards as the magazine is moving from the front toward the back of the search device. A rear hold-back pin is shown at 102 mounted on the end of one arm of a bell crank lever 103, pivoted at 104 on the standard 46, and having its opposite arm pivotally connected to the plunger 105 of a solenoid 106. The end of the last mentioned arm is extended at 107 to engage and operate a switch 108 when the solenoid 106 is energized. The forward hold-back pin 101 is mounted on the end of one arm of a bell crank lever 109 pivotally mounted on the standard 46 at 111 and having its other arm pivotally connected to the plunger 112 of a solenoid 113. An obvious alternate construction is to use a single hold-back pin mounted on a single lever which is spring biased in one direction, for example, the forward direction, to hold back thereat and which is solenoid-operated against the spring in the rearward direction to hold back thereat. In this case, the switch 76 may have single-throw operation.

Figure 5:
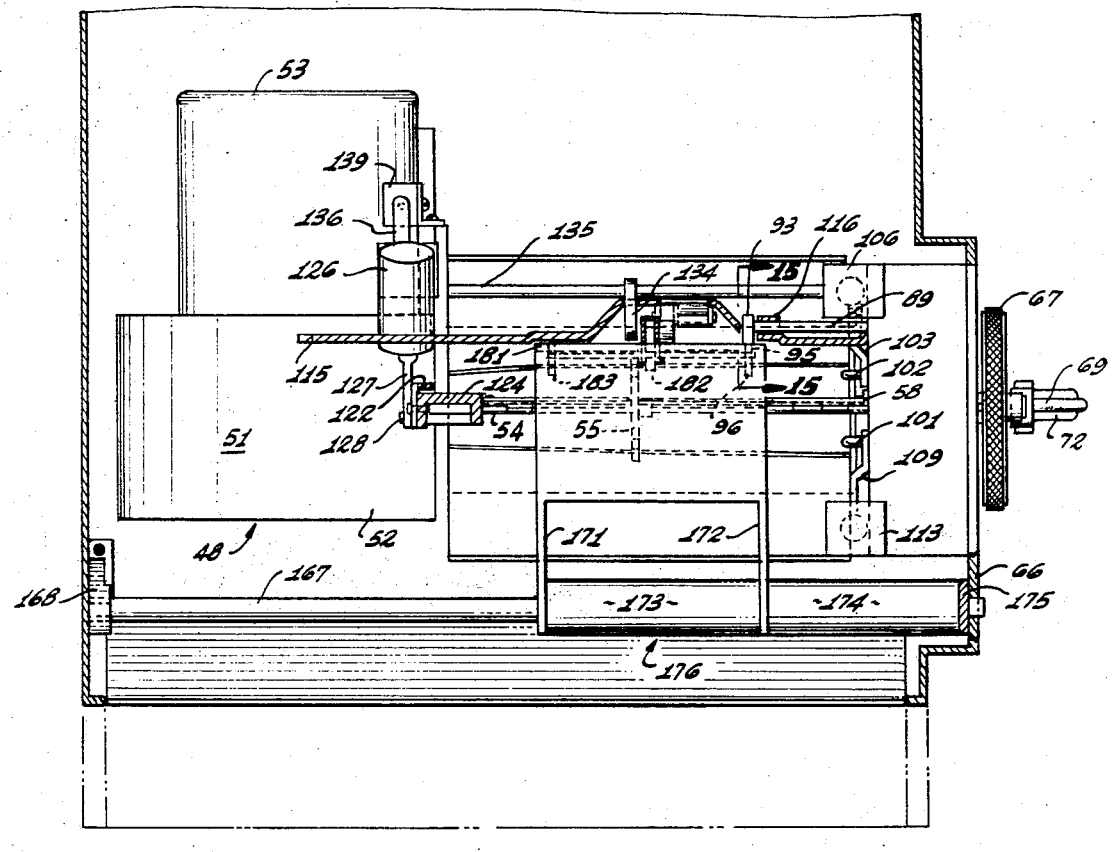
FIG. 5 is a horizontal sectional view through the device.

A stationary, arcuate card guide member 115 is provided by a formed arcuate plate, shown in section in FIG. 5, and mounted between the standards 46 and 47. The shaft 89 is also pivotally supported therein at 116. The guide member 115 has a stationary optical gate therein at 117 against which the microfiche card is clamped in viewing position. A lens system support 118 is mounted at the back side of the card guide plate 115 on the standard 47 and is focussed by means of a pivoted lever 119 moved by a traveling nut 121 on the focussing shaft 50. To clamp the microfiche card against the stationary optical gate 117 a pivoted gate 122 is provided having an optical opening 123 therethrough and pivotally mounted by a hub 124 on the shaft 54. The pivoted gate 122 is biased to clamping position by a spring 125 and is moved to open position by a solenoid 126 mounted on the standard 47 and having its plunger 127 pivotally connected to the pivoted gate at 128 (FIGS. 5 and 7). The optical image passes through the lens system at 129, is reflected and inverted by a mirror 131 and directed along line 132 to the viewing screen 33. The projection light is extended through the optical gate by a suitable mirror system 133 (FIG. 4).

A rear, card-separator arm 134 is rigidly mounted on a rotatable shaft 135 which is pivoted in the opposite standards 46 and 47 and has an operating lever 136 rigidly connected thereto. The lever 136 is pivotally connected at 137 to the operating plunger of a solenoid 138, and is located to effect operation of a switch 139 mounted on the standard 47 (FIGS. 5 and 7). The solenoid 138, when energized, rotates the shaft 135 to move the card separator arm out of the card magazine, and when de-energized, the card separator arm 134 is moved into the magazine in card-separating position by a biasing spring 141. The switch 139 has a pair of normally opened contacts 139A and 139B. The solenoid coil 138 has a time delay capacitor 140 in parallel therewith to insure the proper sequence of operation (FIG. 15).

The microfiche card magazine to be utilized in the search and display device of this invention may be of any form, that selected for illustration being shown in detail in FIGS. 16–20 of the drawing as comprising a base 142 and upstanding end walls 143 and 144. End wall 143 is supported by a pair of rollers 145 riding on the base 31 for movement through the device, and the end wall 144 has a bottom flange extension 146 for reception in a complementary groove 147 in the base 31. The rear edge of the end wall 144 and flange 146 has the slot 84 therein receiving the operating pin 83. The magazine is thereby guided and moved rectilinearly forward and rearwardly of the device as the rack 82 is moved by the pinion 81.

A pair of front and rear magazine closing plates 147, 148 are pivotally mounted to the magazine base 142 at 149 and 151, respectively, and are stopped in their outward swinging by surfaces 152 on short inwardly extending ledges 153 at the opposite sides of the end walls 143 and 144. The microfiche cards 154 may be horizontally stacked within the magazine on the base 142, between the end walls 143 and 144 and the front and rear plates 147 and 148 and nothing more need be provided. With some cards it is found desirable to divide them into sections by intermediate plates 155 which have been illustrated with opposite bottom tabs 156 extending in pivotal relation through restricted openings 157 in the base 142 which beneath the restricted openings is provided with enlargements 158 in which the ends of the tabs 156 may freely swing. The tabs 156 may be split at 159 to provide resilient fingers 161 having hooked ends interlocking with the base 142, as shown more particularly in FIG. 20.

A stack or deck of microfiche cards 154 is shown in a top plan view in FIG. 19 having a diagonal slot 162 thereacross providing individual notches 163 in the individual cards, as shown in FIG. 21. By the location of the individual notches 163 relative to the numbered lines 56 on the shaft 54, as viewed through the window 44, the card positioned at the pick-up position may be roughly identified and finally identified by alpha-numerical information at 164 on the cards. The rear plate 148 and the intermediate separator plates 155 are provided with central notches 165 in their upper edges to clear the riffling or card gate wheel 55 and with corner notches at 166 to clear the hold-back pins 101 and 102.

A transverse stationary shaft 167 for the card pick-up and manipulator is supported at one end in the plate 66 on the standard 46 and at its opposite end in a standard 168 mounted on the base 31. A card-manipulating plate 169 is carried on a pair of arms 171 and 172 having their ends bored to receive the shaft 167, and having a sleeve 173 therebetween and about the shaft 167. A second sleeve 174 extends to the right of the arm 172, as viewed in FIG. 5, and at the end thereof is disposed an arm 174 also pierced to receive the shaft 167. The arms 171 and 172, the sleeves 173 and 174, and the arm 175 are rigidly secured together, as by welding, into an integral unit which thereby forms in effect a hub 176 mounted on the shaft 167 for rotation thereon and for axial sliding movement relative thereto, and with the card-manipulating plate 169 and the manipulating arm 175 extending from the hub 176.

The manipulating arm 175 terminates in the handle 36 and carries a double-throw switch 177 thereon operated by the switch operator 37. Switch 177 has a normally closed contact 177A and a normally opened contact 177B.

Also mounted on the manipulating arm 175 is an arcuate indexing strip 179 carrying at its end a detent pin 180 adapted to be received in the indexing holes 43 in the front plate 42. The strip 179 and holes 43 are so dimensioned that when the detent 180 is received in a hole 43 the microfiche image identified by that hole will be located in the optical gate for projection on the viewing screen.

The card-manipulating plate 169 has a flange 181 at its end on which are pivotally mounted card-clamping fingers 96, 182 and 183, all rigidly mounted on a torque shaft 184 and biased toward clamping position by a spring 185. A finger-operating lever 186 is pivotally mounted at 187, as on a lug pressed out from the flange 181, and carries a pin 188 at one end riding in a slot 189 in the clamping finger 182 to move it to open position against the bias of spring 185. A cam strip 191 is pivoted on the guide plate 115 at 192 and has a bottom edge at 193. The cam strip 191 is biased in the position of FIG. 14 by a leaf spring 194 and the lever 186 has a flange arm 195 adapted to engage and ride on the forward face of the cam strip 191 to rotate the lever 186 and move the card clamping fingers to open position. In the position of FIG. 14 the flange arm 195 has snapped beneath the cam strip edge 193, permitting the fingers to clamp the upper edge of the desired microfiche card. As the card is manipulated into the dotted line position of FIG. 14, the arm 195 rides freely up the back of the cam strip 191 which moves forward into the dotted line position against the bias of the leaf spring 194.

OPERATION OF THE FIRST EMBODIMENT

The function and operation of the first embodiment of the device have been generally explained in the description of the parts, so that the over-all operation of the device should be apparent.

In the following description, it will be assumed that the search of a given magazine has been completed, that it has been removed, and a new magazine is to be inserted for search, retrieval and display of the cards therein. In this condition the rack 82 will be in the forward position and the hinged front plate 32 swung forwardly to permit access to the interior of the device. This will involve unlatching of the plate 32 by obvious mechanical means (not shown) to permit it to be swung to its forward, magazine-receiving position. The handle 36 will be in the position of FIG. 1 and the card-manipulating plate 169 in its dotted line position of FIG. 4 with its flange above the magazine, and the clamping fingers opened by the engagement of the flange arm 195 on the forward face of the cam strip 191. Lever 93 has been rotated counterclockwise, as viewed in FIG. 13, by projection 95 on finger 96 and shaft 89 has moved detent 88 to the free position, thereby operating switch 92 to close contacts 92A and 92B. With contact 92A closed, the card separator solenoid 138 is energized to move the card separator arm 134 against the bias of spring 141 into its upper, inoperative position. This also closes contacts 138A and 138B. Detent 39 is engaged in the notch 41 to hold the handle 36, the arm 175, and the card-operating plate 169 in the dotted line position of FIG. 4.

A magazine of the form shown in FIGS. 16–20 is now inserted in the device with the depending flange 146 in the base groove 147 and with the notch 84 in the cam end plate 144 engaged with the pin 83 on the rack 82. The wheels 145 rest on the base 31, as shown in FIG. 2, and the magazine is now positioned to be moved bodily through the device coincident with retraction of the rack 82 by the pinion 81 as the wheel 67 is rotated by its handle 69. To search the microfiche cards in the magazine to locate a desired card in the pick-up position, the motor 53 is energized to start the air blast from the fan 48 from side to side across the magazine, this air, after traversing the cards, passing freely through an opening in the standard 46 as indicated by the arrow labeled "Air" in FIG. 2. The operator 72 is moved against the handle 69 to move the detent 71 out of the pocket 68 in which it is disposed. Rotation of the wheel 67 now rotates the shaft 54 through the gears 62 and 59 to rotate the riffling wheel 55 in accordance with the gear ratio provided, in the example given a relative speed of 5:1. As soon as the wheel 67 starts to rotate, it will, through the friction clutch 75, rotate the movable contact of switch 76 to engage contact 76B to energize the solenoid 113 and move the forward hold-back pin 101 into the position of FIG. 6 where it retards the movement of the upper corners of the cards from the front toward the rear of the device. The circuit is made from the positive source 200 through contact 177A, contact 76B, solenoid coil 113, and contact 92B to ground. Rotation of the wheel 67 is accompanied by individual movement of the cards past the shaft 54 as their upper edges are received in the card gate notches 85 in the riffling wheel 55 to move the cards individually from one side to the other of the shaft 54. The pick-up position is at the back of the wheel 55, as shown in FIG. 14. The cards are maintained separated by the air blast therethrough, and by the action of the hold-back pin, as shown in FIG. 6. Rotation of the operating wheel 67 also rotates shaft 79 and pinion 81, through bevel gears 61, 77 and worm gears 79, 80, and rack 82 moves rearwardly, carrying the card magazine bodily therewith.

The upper edges of the cards are viewed through the window 44 during the riffling operation and the rough address of the cards secured from the notch 163 appearing in relation to the indicia lines on the shaft 56 and the number strips 57, 58. Final identification of a card at the back of the wheel 55 is made by the indicia 164 thereon and when a card is so located, the wheel 67 is stopped and the operator 72 released to index the detent 71 with the appropriate pocket 68 to insure the location of the desired card in the pick-up position.

The handle 36 and operators 37 and 38 are now engaged, thereby releasing the detent 39 from the notch 41 and operating switch 177 to open contact 177A and close contact 177B. Opening of contact 177A de-energizes the separator solenoid 138 which times out to permit the separator arm 134 to be moved into the magazine under the bias of the spring 141, thereby engaging all cards in back of the wheel 55 except the single desired card in the pick-up location immediately in back of the wheel. The handle 36 is now operated to rotate the arm 175 counterclockwise, as viewed in FIGS. 4 and 14, rotating the integral hub 176 and card-manipulating plate 169 therewith into the full line position of FIG. 14.

In this movement from the dotted line position of FIG. 4 to the full line position of FIG. 14, the flange arm 195 moves beneath the cam strip edge 193 and the lever 186 is snapped into the position of FIG. 14 as the clamping fingers 96, 182 and 183 close under the bias of spring 185. It will be understood that while spring 185 is shown as operating directly on the clamping fingers, it can operate, alternatively, on the lever 186 as well, applying pressure through the pin 188 and slot 189 connection. As the clamping fingers close, they grip the top of the microfiche card 154, as shown in FIG. 14, and the angle of engagement between the flange 181 and the fingers at the plane 201 is such as to bias the bottom end of the card toward the left, as viewed in FIG. 14, so that as a card is withdrawn into the dotted line position, the bottom edge of the card will be guided against the plate 115 to prevent scratching or other injury to the image surfaces on the microfiche cards. This plane 201 is therefore not tangential to the axis of the shaft 167, but at a definite predetermined angle, for example, 12° out of tangency, to effect a curvature of the card in the Y-direction and insure the indexing of the images thereon at the optical gate at equal regular intervals.

When the clamping fingers close, the projection 95 permits rotation of the lever 93 under its bias in a clockwise direction, as viewed in FIG. 13, whereby the detent 87 moves into its locking position of FIG. 8 and releases the switch 92, whereby contacts 92A and 92B open to de-energize everything except the optical gate solenoid circuit. When the switch 177 was operated, contact 177B closed to energize the optical gate solenoid 126 directly to ground, thereby opening the optical gate 122 against the bias of its spring 125. The microfiche card 154 therefore moves freely past the optical gate 122 without rubbing thereon in its movement into the full line position of FIG. 14 and the dotted line position of FIG. 14, as the card manipulating plate 169 is moved by the hub 176, arm 175, and handle 36, so that flange 181 and the parts thereon clear the optical gate.

The first movement of the card 154 out of the magazine is rotary only. When this position is reached, the outer end of the arm 175 will be below the bottom edge 40 of the plate 42 and the arm 175, hub 176 and card-manipulating plate 169 with the clamped card may be bodily moved in both X- and Y-directions, axially and rotatably of the shaft 167, until the detent 180 engages into the hole 43 identifying the desired image at the optical gate. At this time, physical motion ceases, and the switch operator 37 is released to open contact 177B, thereby de-energizing the gate solenoid 126 and permitting the gate 122 to close against the microfiche card and clamp it in the optical gate under the bias of the spring 125. The optical image is thereafter projected onto viewing screen 33.

When viewing is completed, the operator 37 is again moved toward handle 36 to close contact 177B, energize the optical gate solenoid 126, and open the optical gate 122, so that the card 154 may be freely moved back into the magazine into the dotted line position of FIG. 4. In the final Y-direction rotative movement, the flange arm 195 rides on the cam strip 191 to rotate the lever 186 into the dotted line position of FIG. 4, thereby opening the card clamping fingers and releasing the card into the magazine. With the finger 96 opening, its projection 95 engages lever 93 to open the locking detent 88 and operate switch 92 to closed position. The operators 37 and 38 are now released, whereby the detent 39 engages to lock the card manipulating plate 169 in the dotted line position of FIG. 4 and switch 177 returns to the position of FIG. 15. The separator solenoid 139 is thereby again energized to pull the separator arm 134 out of the magazine in preparation for a further search of the cards therein.

Switch 76 is operated through the friction clutch 75 to close either contact 76A or 76B, depending upon the direction of rotation of the wheel 67. When riffling is done in the opposite direction, that is, from the back toward the front of the magazine, contact 76A is closed to energize the rear hold-back solenoid 106 for hold back pin 102 through the now closed contact 139B operated by the separator solenoid 138. The energization of the rear hold-back solenoid 106 also operates switch 108 to open the circuit through 139A to the separator solenoid 138, which, however, is energized through the closed contact 92A. The operation proceeds with riffling in this reverse direction until the desired card is located, as before, and the operation proceeds as previously described to locate the desired card at the back of the riffling wheel 55, then to de-energize the separator solenoid 138 to permit the separator arm 134 to move the cards away from the desired card, and then to move the manipulating plate 169 into its full line position of FIG. 14, thereby operating the clamping fingers, as previously described, through the lever 186 rotating as its flange arm 195 passes the edge 193 of the cam plate 191. Operation of the fingers into clamping position again moves the detent 87 into locking position, opening switch 92 and de-energizes the circuits, except for the optical gate solenoid 126 which is again energized through contact 177B to permit free movement of the selected card 154 in the Y-direction by rotation about the shaft 167 and then by movement in the X-direction axially of the shaft 167 or in X- and Y-directions axially and rotatably of shaft 167, until the detent 180 engages the opening 43 in the front plate 42 identifying the image desired to be disposed at the optical gate and displayed on the screen.

The operation proceeds as above with riffling in either direction, as desired, to reach the desired card in the magazine in the device until all desired cards in that magazine have been located, whereupon the magazine may be moved to its extreme forward position and removed from the device for the substitution of a new magazine therefor.

THE SECOND EMBODIMENT

The second embodiment of the invention is illustrated in FIGS. 23–32 of the drawing. This embodiment incorporates many features of the first embodiment and this description will be mainly directed to those portions in which the second embodiment differs from the first. The second embodiment has a base 31A and employs the same standards 46 and 168 as the first embodiment, has the same stationary shaft 167 and the same integral card manipulator plate 169, hub 176, and manipulating arm 175. The arm 175 carries the switch 177, which is operated by a switch operator 37A pivoted on the handle 36 at the end of the arm 175 by the pin 20. A detent operator 38A is also pivoted on the handle 36 at 20 and carries a detent roller 39A adapted to index with a notch 41A on a stationary arm 205 mounted on the standard 46.

The operating mechanism within the standard 46 is the same in the two embodiments, as are the operating wheel 67 and handle 69. The operator 72 for detent 71 is received in the same circularly arranged pockets 68 in the plate 66 on the standard 46. The same shaft 54 carries the same riffling wheel 55, with the card and gate notches 85 and with the shaft 54 rotated at a 5:1 ratio with rotation of the driving wheel 67. The driving wheel 67 rotates the same vertical shaft 79, driving a pinion which engages and reciprocates the rack 82, carrying the pin 83 to move the magazine fore and aft in the device. The fan 48 and driving motor 53 are the same as in the first embodiment.

A similar guide plate 115A is used and the movable optical gate at 122 is pivoted at 206 on a supporting block 207, the gate being opened upon energization of a solenoid 126A, as before, and biased closed by a spring 125A. A friction plate 208 is provided engaging the upper edges of the microfiche cards in the magazine, the friction plate being mounted on arms 209 pivoted at 211 and biased toward the cards by springs 212 and limited in its opposite movements by pin and slot connection 213. The friction plate retards movement of the card edges and bleeds off some of the static electricity which tends to attract the cards together. The hold-back pins 101 and 102, their operating solenoids 106, 113 and the associated mechanism are omitted from the second embodiment, as are also the friction clutch 75 and the switch 76.

The card corner hold-back in the second embodiment is provided by a finger wheel 214 mounted on the shaft 54 on the side of the riffling wheel 55 toward the standard 46. The wheel 214 has fingers 215 thereon which are equal in number to the card gate notches 85 on the riffling wheel 55, and which are located in substantial angular alignment with the notches, as shown more particularly in FIGS. 22 and 31. Movement of the upper corners of the microfiche cards remote from the blower is retarded, both by engagement with the plate 28 and the fingers 215.

The card separator arm is shown at 216 having a downwardly directed card-engaging finger 217 and pivotally mounted at 218 on a block 219 mounted on an arm 221 pivotally mounted at 222. The card separator solenoid shown at 138A is of the rotary type which rotates its shaft 220 in one direction when energized, the shaft rotating in the other direction when de-energized under a built-in spring bias. A mounting bracket 223 is secured to the back face of the card guide plate 115A as by studs 224, and the solenoid 138A is mounted on the bracket 223 by a bolt and nut mounting 225. A crank arm 226 is mounted on the inner end of the shaft 220 by an integral hub 227. The crank arm 226 carries a pin 228 riding in a slot 229 in the arm 221. A stub rod 231 is rigidly mounted on the bracket 223 by a stud 232 and the arm 221 is loosely pivoted on the stud 222 in the inner end of the stub rod 231. A cam block 233 is rigidly mounted on the back face of the guide plate 115A and has in one side thereof continuous cam slot 234 with an upper branch 235 and a lower branch 236 joined at their ends. The card separator arm 216 has a pair of lugs 237 thereon carrying a pin 238 which is guided in the cam slot 234 to insure proper movements of the separator finger 217 as it moves out of and into the magazine, in the latter case to engage and separate the cards from the card desired for pick up.

A gear wheel 241 is rigidly secured on the shaft 54 immediately adjacent the standard 46 and meshing therewith is a short rack 242 having a forwardly-projecting, smooth portion 243, and an integral, rearwardly-extending arm 244. The arm 244 has an integral end lug 245 slotted at 246 to receive a crank pin mounted on a plate 248 rigidly secured on the shaft 220 of the solenoid 138A. When solenoid 138A is energized, it rotates the plate 248 in a clockwise direction, as viewed in FIG. 28, to move the arm 244 and rack 242 rearwardly until the clear portion 243 is disposed above the gear wheel 241 which is then free to rotate with the shaft 54. Also, when the solenoid 138A is energized, the card separator arm is moved inwardly and upwardly into the position shown in dotted lines in FIG. 23 with the pin 238 adjacent the upper end of the cam slot 234 and the separator finger 217 out of the magazine, so as not to interfere with the cards therein.

The card manipulating plate 169 has a similar downwardly projecting flange 181 on which are rigidly secured mounting brackets 251 which pivotally mount a torque bar 252 carrying card clamping fingers 253. A finger operating lever 255 is pivoted at 254 and carries a pin 256 sliding within a finger groove 257 to effect opening and clamping movements of the fingers 253. The lever 255 carries a stop pin 258 to which is attached an operating spring 259 fixed to plate 169. The lever 255 carries a roller 261 on the opposite side of the pivot 254 from the pin 256, which roller cooperates with a cam strip 262 to effect opening and clamping movements of the contact fingers. The cam strip 262 is pivoted at 263 to a mounting bracket 264 attached by studs, as shown, to the card guide plate 115A and is biased to the position shown in FIG. 26 by a leaf spring 265. The roller 261 rides on the forward surface of the cam strip 262 to open the clamping fingers 253 and snaps past the end edge 266 to move the fingers into clamping position.

An interlock switch 267 is mounted on the flange 181 and has a pivoted operating arm 268 mounted thereon and biased by spring 269 to closed position. The switch 267 is operated to closed position when the clamping fingers 253 are open. When the fingers 253 close, a crank 271 on the torque bar 252 engages the end of the operating arm 268 to move it against its bias to permit the contacts of switch 267 to move to open position.

OPERATION OF THE SECOND EMBODIMENT

Figure 22:
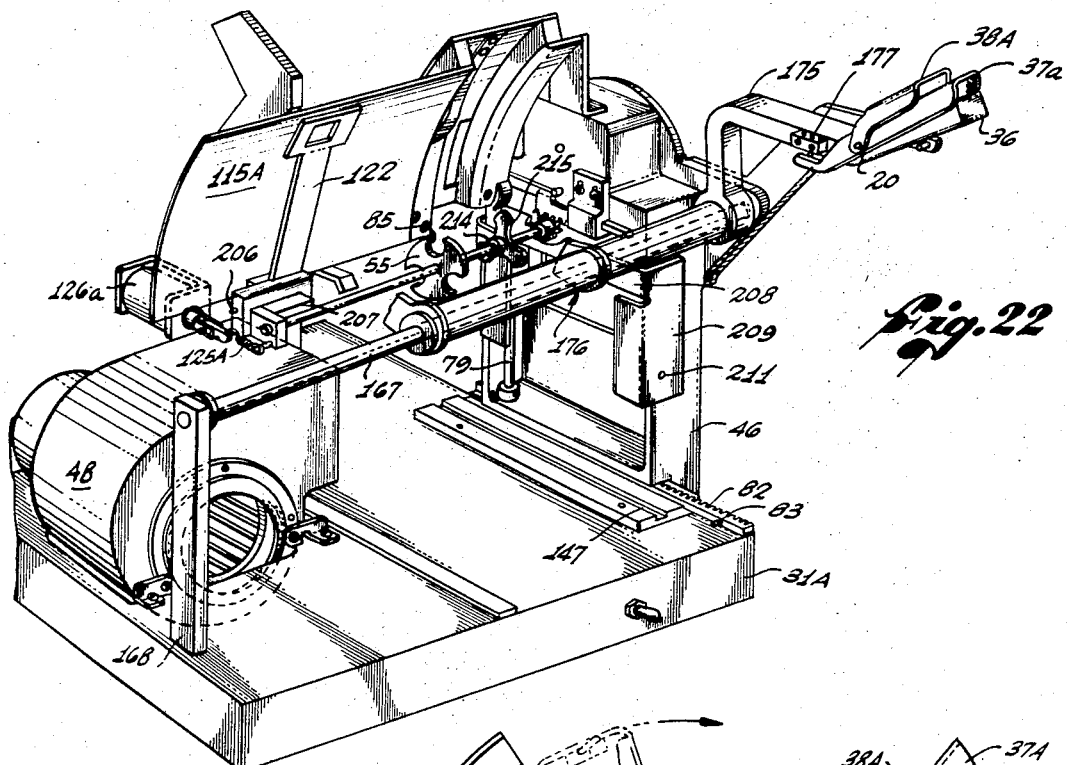
FIG. 22 is a perspective view of a second embodiment of the invention with the cover and other parts removed for clarity.
Figure 23:
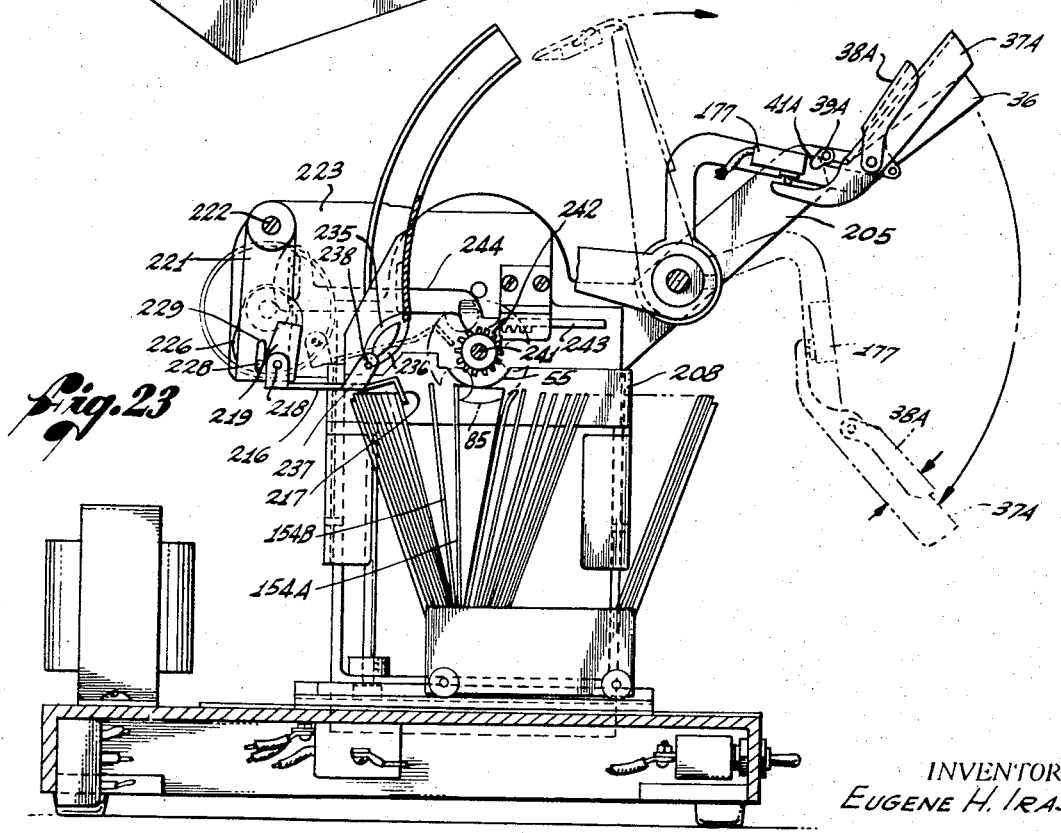
FIG. 23 is a vertical sectional view through the embodiment of FIG. 22 with parts removed and with the card separator in the magazine.

In the operation of the second embodiment, the same type magazine as in FIGS. 16–20 may be used, and is inserted in the same way with the flange 146 in the groove 147 and the notch 84 receiving the pin 83 on the rack 82. At this time, the detent roller 39A will be in the slot 41A, as shown in FIGS. 22 and 23. The card manipulator plate 169 will be in the full line position of FIG. 23 with the roller 261 engaged with the surface of the cam strip 262 so that the clamping fingers 253 are open, whereby the crank 271 permits the switch 267 to be in closed position. As shown in FIG. 32, this energizes the separator solenoid 138A from the source 200 through contact 177A, the now-closed contacts of switch 267, and the separator solenoid to ground. With the separator solenoid energized, the arms 226 and 221 rotate counterclockwise, as viewed in FIG. 23, and the pivot 218 rotates therewith to move the card separator arm 216 into the dotted line position of FIG. 23, out of the magazine and out of the way of the microfiche cards therein. The guide pin 238 will be at the upper end of the cam slot 234 in this position. When separator solenoid 138A was energized, it rotated plate 248 clockwise, as viewed in FIG. 28, thus pulling the arm 244 and rack 242 toward the rear to place the free end 243 about the gear wheel 241 which is thereby free to rotate.

The operator 72 is now moved toward the handle 69 to withdraw the detent 71 from the pocket 68 in which it is located, and the wheel 67 is rotated to rotate shaft 54 and the riffling wheel 55 to riffle the cards therepast, and to rotate shaft 79 to move the magazine bodily in the device. Hold-back for the corners of the cards opposite the blower is provided by the fingers 215 and the manner in which the cards pass through the riffling wheel or card gate member 55 is illustrated in FIGS. 30 and 31 where a card 154A is shown in mid-passage through the riffling wheel from the forward to the back side thereof. The center portion of the card 154A is shown at the sectioned edge 275 which is within the card gate notch 85, while the right hand edge of the card adjacent the standard 46, shown at 276, is prevented from following the plane of the center 275 by being held back by the finger 215. This action is shown in FIG. 31 which is taken from the standard 46 side of the card and showing the adjacent edge 276 held back while the center 275 is being pulled through the card gate notch 85. When past the riffling wheel 55, the card 154A will assume the position of the card 154B which is the pick-up position.

Assuming that card 154B has an image thereon which is is desired to project on the viewing screen, when the card 154B was in the position of card 154A, further rotation of the wheel 67 was stopped and the detent 71 permitted to index in a pocket 68. The switch operator 37A was then moved to operate the switch 177 and open contact 177A, thereby deenergizing the separator solenoid 138A. With the separator solenoid de-energized, its return spring rotated it in the reverse direction to that explained for energization whereby the pivot point 218 for the separator arm 216 rotated clockwise, as viewed in FIG. 23, with the pin 238 riding down the lower branch 236 of the cam slot 234, thereby engaging the finger 217 with all of the cards at the back of the riffling wheel 55. It is to be noted there is a departure here from the first embodiment where only those cards other than the card in the pick-up position were engaged. In the second embodiment, all of the cards at the back of the wheel 55 are engaged and pulled into separated position.

When solenoid 138A was de-energized, pin 247 rotated in a counterclockwise direction, as viewed in FIG. 28, to move the arm 244 and rack 242 forwardly, thereby rotating the gear wheel 241 in a clockwise direction, as viewed in FIG. 23, moving the card which was in the card gate 85 beneath the shaft 54 to the back of the wheel 55 in the pick-up position 154B. Therefore, in the second embodiment, the desired card is not moved fully into pick-up position by manual rotation of the wheel 67, but is manually stopped in the position immediately beneath the shaft 54 and is automatically moved to the pick-up position by the action of the track 242 on the gear wheel 241. This insures that the card separator finger 217 does not interfere with the desired card, since it enters the magazine and separates the cards toward the back before the desired card is in pick-up position. In rotating gear wheel 241 and the shaft 54 in this automatic operation, the wheel 67 is moved through one angular position of the detent 71, it readily leaving its indexed pocket against its bias.

Assuming the desired image is on the card in position 154B, the detent operator 38 is moved toward the handle 36 and the handle, the integral arm 175, hub 176 and card carrier plate 169 are rotated counterclockwise from the position of FIG. 23 through the full-line position of FIG. 26 which is taken just before the roller 261 passes the end 266 of the cam strip 262. When the plate 169 is moved sufficiently for the roller 261 to pass the end 266, the lever 255 snaps clockwise, as viewed in FIGS. 25 and 26, thereby moving the card clamping fingers 253 from the open position of FIG. 26 to the closed or clamping position of FIG. 25. This rotates the crank 271 to operate switch 267 to open position, whereby the separator solenoid 138A is prevented from being energized if the switch 177 is released. With the switch 177 operated, as previously described, contact 177B is closed to energize the gate solenoid directly from the source 200 through contact 177B and the gate solenoid 126A to ground. The gate 122 is thereby rotated to open position, whereby the card may freely move through the optical gate without rubbing the card being guided, as before, on the card guide plate 115A by its lower edge engagement therewith, the clamping point for the upper edge of the card being spaced from the guide plate.

The retrieved card is again moved in the Y-direction by rotation of the hub 176 about the shaft 167 until the mechanical parts on the flange 181 close the optical gate, whereupon the hub 176 and the card carrier plate 169 are moved axially and rotatably of the shaft 167, as in the first embodiment, to locate the detent 180 in the hole 43 which identifies the specific image desired as being in the optical gate 117. At this time, the switch operator 37A is released and the switch 177 returns to the position of FIG. 32, thereby de-energizing the gate solenoid 126A to clamp the microfiche card against the stationary optical gate under the bias of spring 125A. At this time, the separator solenoid cannot be energized because the switch 267 is opened, and the cards are held back for easy reinsertion of the card 154B into the magazine.

When viewing is finished, the switch operator 37A is again moved toward the handle 36, thereby closing contact 177B to re-energize gate solenoid 126A and move the pivoted gate 122 to open position. Hub 176 and the card plate 169 with the microfiche card thereon are moved axially of the shaft 167 in the X-direction back to the initial position and then rotated counterclockwise in the Y-direction into the position of FIG. 23, where the roller 261 rides on the cam plate 262 and opens the clamping fingers 253 to release the card 154B for return into the magazine. Opening of fingers 253 permits switch 267 to close and the separator solenoid 138A will be reenergized when the switch 177 is released. As in FIG. 23, the detent 39A will again be engaged in the notch 41A to hold the card clamping fingers above the magazine cards and, with the separator solenoid energized, the card separator arm 216 and its finger 217 are moved upwardly above the magazine to clear the cards therein, the pin 238 riding up the upper leg 235 of the cam slot 234. With the separator solenoid energized, the arm 244 and rack 242 are moved rearwardly to place the free portion 243 above the gear wheel 241 which is now free to rotate with the shaft 54 as the wheel 67 is rotated, and the device is again in position to perform a riffling search operation.

Various modifications and changes may be made with regard to the foregoing detailed description without departing from the spirit of the invention.

I claim:

1. A search and retrieval device for card-type items in a horizontal stack comprising:

a blower for directing air sidewise across the stack to separate the items over a portion thereof;

a riffling wheel located with its axis parallel to and above the items in the stack;

a card gate notch in the edge of said wheel receiving the top edges of the items to move them successively past said wheel;

means for rotating said wheel to move the top edges of the items therepast;

means operating simultaneously with the rotation of the wheel for effecting relative movement between the bottom edges of the cards and the vertical plane of the wheel axis, said wheel rotation locating a desired item in a pick-up position; and means for entering said stack and retrieving said desired item.

2. The device defined in claim 1, including:

a plurality of card gate notches angularly spaced about the periphery of said wheel to move a plurality of items individually past the wheel on each rotation thereof.

3. The device defined in claim 1, in which said notch is of open-ended oval shape presenting curved edges for engagement with the top edges of the items as the wheel is rotated in opposite directions to riffle in opposite directions through the items in the stack.

4. The device defined in claim 1, including:

hold-back means for retarding movement of the upper corners of the items opposite the edge at which the air enters to facilitate separation of the items and the movement of a single item at a time in the card gate notch past the wheel axis.

5. The device defined in claim 4, including:

means for directing said hold-back means in opposite directions against said item's corners as the wheel is rotated in opposite directions to riffle the items in opposite directions.

6. The device claimed in claim 4, including:

a pair of said hold-back means located respectively in front and in back of said wheel axis; and means for operating said hold-back means alternately as the wheel is rotated in opposite directions to riffle the items in opposite directions.

7. The device claimed in claim 6, including:

a double-throw, frictionally driven switch;

individual solenoids for said hold-back means alternately energized by said friction switch in its opposite positions; and means interconnecting said friction switch and riffling wheel to effect operation of the switch in the direction governed by the direction of rotation of the riffling wheel.

8. The device defined in claim 4, in which:

said hold-back means comprising a card-engaging finger located coaxially with said riffling wheel to rotate therewith on the side of the wheel remote from the entrance for the air, said finger being substantially angularly aligned with said card gate notch and engaging the upper corners of the items remote from the air entrance edge to retard movement of the corners as the items move into engagement with the riffling wheel to facilitate separation of the items and entrance of a single item into the card gate notch.

9. The device defined in claim 8, including:

a plurality of card gate notches angularly spaced about the periphery of said riffling wheel to receive the upper edges of items individually therein; and a plurality of hold-back retarding fingers equal in number to said card gate notches and individually aligned therewith.

10. The device defined in claim 1, including:

an optical gate made up of stationary and movable parts between which a desired item is to be clamped in retrieved position for the projection of an image on the item positioned in the optical gate; and means for opening said optical gate while said retrieving means is moving said desired item to prevent scratching of the surface of the item and for closing the gate to clamp the item when the desired image is located at the gate.

11. The device defined in claim 1, including:

an operating handle for said retrieving means;

an electric switch and operating means therefor mounted to move said handle; and a detent and operating means therefor mounted to be movable with said handle, said detent engaging stationary indexing means to hold said retrieving means in inoperative position above the stack.

12. The device defined in claim 11, including:

an optical gate having item clamping means thereat;

solenoid means controlling said clamping means; and means electrically connecting said solenoid means to said handle switch.

13. The device defined in claim 1, including in combination:

a magazine for holding said horizontally stacked card-type items and readily removable and replaceable in the device;

rectilinearly movable drive means in said device movable transversely of said wheel axis;

means engaging said magazine with said drive means; and means interconnecting said drive means with said riffling wheel so that rotation of said wheel is accompanied by rectilinear movement of said drive means to bodily move the magazine relative to the device.

14. The device defined in claim 13, including:

an elongated flange at one end of said magazine guidingly received within a longitudinal groove in said device to guide forward and rear movements of the magazine relative to the device by said drive means.

15. The device defined in claim 13, including:

forward and end plates hingedly mounted on said magazine adjacent the bottom thereof; and means limiting the outward swinging movement of said forward and back magazine plates and providing for the separation of the items in the stack into a substantially V-separated relation at the riffling wheel.

16. The device defined in claim 13, including:

a plurality of longitudinally spaced slots in the bottom of said magazine;

a plurality of separator plates hingedly mounted in said slots to divide a stack of card-type items into sections within the magazine;

forward and rear walls for said magazine hingedly mounted adjacent the bottom thereof; and means limiting the outward swinging movement of said forward and rear magazine plates and serving to divide the items into a generally V-separated relation at the riffling wheel.

17. The device defined in claim 16, including notches in said separating plates receiving and clearing said riffling wheel.

18. The device defined in claim 1, in which:

said stack, when in a tight deck, being diagonally notched across the top surface of the deck to provide individual notches in the items which are spaced sidewise from item to item, with the invidual notches readily apparent from the front of the device when cards are separated at the riffling wheel; and transverse indicia means adjacent the axis of said wheel for roughly identifying an item at the wheel by the position of its top edge notch relative to the indicia means.

19. The device defined in claim 1, including:

an enclosure for said device including a front wall;

a display screen forming a portion of said front wall; and optical means within the enclosure for displaying an image on a retrieved card on said screen.

20. The device defined in claim 19, including:

a window beneath said screen through which the top edges of the items adjacent the riffling wheel may be viewed to identify a desired item thereat.

21. The device defined in claim 19, including:
a plurality of indexing means associated with said front wall equal in number and position to the images appearing on said items;
an optical gate for said device positioned to have the images on said item disposed thereat; and
means on said item-retrieving means for engaging said front indexing means to locate a desired item image in the optical gate.

22. The device defined in claim 1, including:
clamping means on said retrieving means for grasping and holding the top edge of a desired item; and
means for automatically operating said clamping means to engage the desired item when said retrieving means has entered the stack.

23. The device defined in claim 22, in which:
said clamping means including clamping fingers;
said operating means including a pivoted lever for moving said clamping fingers to open and closed positions;
a cam strip; and
means on said lever riding on the surface of said cam strip to move said clamping fingers to open position, said lever moving past said cam strip surface for free movement to move the fingers to clamping position when the retrieving means is in the stack.

24. The device defined in claim 23, in which:
said cam strip is pivotally mounted so that the means on the lever engaging the cam strip surface moves freely up the back of the strip, moving it forward on its pivot, as the retrieving means withdraws a desired item from the stack.

25. The device defined in claim 23 including:
a plurality of transversely spaced fingers for engaging and clamping the top edge of the desired item, said operating lever for the fingers cooperating with one only of said fingers; and
a torque bar interconnecing the fingers for exerting clamping forces on the item by all the fingers.

26. The device defined in claim 1, including:
item-separating means for entering the back of said stack to move all items in back of the wheel but the item in the pick-up position toward the rear of the stack to insure their separation from the desired item; and
means for operating said item-separating means into and out of the stack and providing for its movement into the stack to effect item separating prior to movement of said retrieving means into the stack.

27. The device defined in claim 26, in which said operating means include:
a solenoid,
an interlock switch controlling the energization and de-energization of said solenoid;
means on said retrieving means for clamping the upper edge of the desired item; and
means for operating said switch in synchronism with opening and closing of said clamping means.

28. The device defined in claim 27, including:
locking means for said riffling wheel operating simultaneously with said clamping means and switch.

29. The device defined in claim 1, and including a friction plate biased into engagment with the upper edges of the cards at the side opposite the air entrance edge.

30. The device defined in claim 1, including:
item-separating means for entering the back of said stack to move all the items in back of the wheel toward the rear of the stack to insure their separation from the desired item:
means for operating said item-separating means into and out of the stack; and
means also operated by said operating means for moving the desired item into pick-up position in back of the wheel, but in front of said item-separating means.

31. The device defined in claim 30, including:
a stationary, elongated-loop cam slot having its axis vertically inclined; and
means on said item-separating means engaged in said cam slot for controlling the movement of the item-engaging end of the separating means into and out of the stack.

32. The device defined in claim 1, including:
item-separating means for entering the back of said stack to move all the items in back of the wheel toward the rear of the stack to insure their separation from the desired item;
means for operating said item-separating means into and out of the stack sequentially to movement of said retrieving means;
a gear wheel rigidly connected to said riffling wheel coaxially thereof;
a short rack engaging with said gear wheel;
means connecting the operating means for said item-separating means to move said rack, said rack when retracted disengaging said gear wheel for free rotation of said riffling wheel;
said riffling wheel being normally stopped with a desired item in the card gate notch and beneath its axis forwardly of the pick-up position; and
said operating means for the item-separating means, when effecting an item-separating operation, also projecting said rack forwardly to rotate the riffling wheel to move the desired card to the back thereof in pick-up position in front of the separating means and the items held thereby.

33. The device defined in claim 32, including:
a stationary, elongated-loop cam track having its axis vertically inclined; and
means on said item-separating means engaged in said cam slot for controlling the movement of the item-engaging end of the separating means into and out of the stack.

References Cited
UNITED STATES PATENTS

| | | | |
|---|---|---|---|
| 1,476,157 | 12/1923 | Fleming | 40—105.5 |
| 3,055,131 | 9/1962 | Novak | 40—36 |
| 3,228,130 | 1/1966 | Novak | 40—37 |

JEROME SCHNALL, Primary Examiner

J. H. WOLFF, Assistant Examiner

U.S. Cl. X.R.

40—105.5; 221—134; 271—10; 353—27